United States Patent
Komiyama (10) Patent No.: US 12,003,636 B2
(45) Date of Patent: Jun. 4, 2024

(54) DEVICE AND METHOD FOR CERTIFYING RELIABILITY OF PUBLIC KEY, AND PROGRAM THEREFOR

(71) Applicant: bitFlyer Blockchain, Inc., Tokyo (JP)

(72) Inventor: Takafumi Komiyama, Minato-ku (JP)

(73) Assignee: BITFLYER BLOCKCHAIN, INC., Tokyo (JP)

( * ) Notice: Subject to any disclaimer, the term of this patent is extended or adjusted under 35 U.S.C. 154(b) by 757 days.

(21) Appl. No.: 17/054,673

(22) PCT Filed: May 10, 2019

(86) PCT No.: PCT/JP2019/018834
§ 371 (c)(1),
(2) Date: Nov. 11, 2020

(87) PCT Pub. No.: WO2019/216435
PCT Pub. Date: Nov. 14, 2019

(65) Prior Publication Data
US 2021/0367779 A1    Nov. 25, 2021

(30) Foreign Application Priority Data

May 11, 2018    (JP) .................................. 2018-092618
Jan. 19, 2019   (JP) .................................. 2019-007394

(51) Int. Cl.
*H04L 29/06* (2006.01)
*H04L 9/06* (2006.01)
(Continued)

(52) U.S. Cl.
CPC .......... *H04L 9/0894* (2013.01); *H04L 9/0643* (2013.01); *H04L 9/0819* (2013.01); *H04L 9/14* (2013.01)

(58) Field of Classification Search
CPC ....... H04L 9/0894; H04L 9/0643; H04L 9/14; H04L 9/0819
(Continued)

(56) References Cited

U.S. PATENT DOCUMENTS

2011/0039592 A1   2/2011  Haddad et al.
2017/0208062 A1*  7/2017  Morikawa ............. H04L 9/0877

FOREIGN PATENT DOCUMENTS

JP    2002244551 A   *  8/2002
JP    2017-126943       7/2017

OTHER PUBLICATIONS

Kato, Yosuke et al., "Implementation of certificate-free public key cryptography in ad hoc networks", The 2010 Symposium on Cryptography and Information Security SCIS2010 [CD-ROM]), non-official translation SCIS2010 [CD-ROM], Jan. 19, 2010, 2E3-3, pp. 1-6.
(Continued)

*Primary Examiner* — Brandon Hoffman
*Assistant Examiner* — Samuel Ambaye
(74) *Attorney, Agent, or Firm* — Cozen O'Connor (57) ABSTRACT

Proving reliability of a second public key of a second key pair generated in association with a first key pair. A generator 210 calculates and stores $x \cdot H(n)$ which is proof data and $ax \cdot H(n)$, when the second public key $ax \cdot g_1$ which is of the second key pair is generated (S301). The generator 210 provides the calculated proof data to a receiving apparatus 220 (S302) which has received the proof data, transmits a proof request to the proving apparatus 230 for requesting a proof that the second public key $ax \cdot g_1$ is generated by an owner of the first public key $a \cdot g_1$ (S303). In response to the proof request, the proving apparatus 230 verifies the proof data by calculating a verification formula for the proof data (S304). The proving apparatus 230 transmits the verification
(Continued)

result as a response to the proof request from the receiving apparatus 220 (S305).

10 Claims, 2 Drawing Sheets

(51) Int. Cl.
*H04L 9/08* (2006.01)
*H04L 9/14* (2006.01)

(58) Field of Classification Search
USPC .......................................................... 713/171
See application file for complete search history.

(56) References Cited

OTHER PUBLICATIONS

Ohtake, Go et al., "Attribute-based encryption with arbitrary number of authorities", IEICE Technical Report, Jun. 24, 2010, vol. 110, No. 114, pp. 153-158.
International Search Report issued in corresponding PCT/JP2019/018834 filed May 10, 2019.
Written Opinion issued in corresponding PCT/JP2019/018834 filed May 10, 2019.
Housani et al., "Survey on Certificateless Public Key Cryptography," 6th International Conference on Internet Technology and Secured Transactions, Dec. 11-14, 2011, pp. 1-6, Arab Emirates.

\* cited by examiner

DEVICE AND METHOD FOR CERTIFYING RELIABILITY OF PUBLIC KEY, AND PROGRAM THEREFOR

RELATED APPLICATIONS

This is a U.S. National Phase Application under 35 USC 371 of International Application PCT/JP2019/018834 filed on May 10, 2019.

This application claims the priority of Japanese application nos. 2018-092618 filed May 11, 2018 and JP 2019-007394 filed Jan. 19, 2019, the entire content of both of which are hereby incorporated by reference.

FIELD OF THE INVENTION

An aspect of the present invention relates to an apparatus, method, and program for proving a reliability of a public key.

BACKGROUND OF THE INVENTION

With the expansion of economic activity on the Internet, there is a growing need to reliably identify the actors of such activity.

Digital certificates are often used to guarantee the reliability of data transmitted over the Internet. A digital certificate certifies the owner of the public key that corresponds to the secret key used to digitally sign the data being transmitted and is issued by a trusted certification authority. The recipient of the data confirms the validity of the digital certificate and verifies the digital signature with a public key.

SUMMARY OF THE INVENTION

Technical Problem

In the future, there will be an increase in the number of situations in which interactions over the Internet need to be reliable, which will lead to an increase in the demand for various forms of electronic certification, depending on the application.

However, current certification authority-centric public key cryptography schemes are not easy to deal with flexibly.

The present invention has been made in view of above problem, and its first objective is to provide an apparatus, method and a program for generating a second key pair comprising a second secret key and a second public key in association with a first key pair comprising a trusted first secret key and a first public key.

Also, a second objective of the present invention is to provide an apparatus, a method and a program for proving the authenticity of a second public key comprising a second key pair generated in association with a first key pair.

Also, a third objective of the present invention is to provide an apparatus, method and a program for executing or verifying an electronic signature using a second key pair generated in association with a first key pair.

To achieve this objective, the first aspect of the present invention is a method of generating a second key pair comprising a second secret key and a second public key in association with a first key pair comprising a first secret key and a first public key, wherein a first secret key is a, a generator of a cyclic group G is g, a first public key is a·g, a second secret key is ax, and a second public key is ax·g, comprising steps of: determining an integer x, multiplying a first secret key a (where a is an integer) by the x to calculate and store a second secret key ax, multiplying the first public key a·g by the x or multiplying the first secret key a by the x and the g to calculate and store the second public key ax·g.

Also, the second aspect of the present invention is a method of generating a second key pair comprising a second secret key and a second public key in association with a first key pair comprising a first secret key and a first public key, wherein a first secret key is a, a generator of a cyclic group G is g, a first public key is a·g, a second secret key is ax, and a second public key is ax·g, comprising steps of: determining an integer x, determining a second secret key ax (where ax is an integer), multiplying the first public key a·g (where a is an integer) by the x, multiplying the first secret key a by the x and the g, or multiplying the second secret key ax by the g, to calculate and store the second public key ax·g.

Also, the third aspect of the present invention is the method according to the first or second aspect, wherein the generator of the cyclic group G is a point of an elliptic curve.

Also, the fourth aspect of the present invention is the method according to the third aspect, wherein the signature scheme by the first key pair is Elliptic Curve DSA.

Also, the fifth aspect of the present invention is the method according to any one of the first to fourth aspects, further comprising the step of transmitting the first public key a·g from a first apparatus that calculated the second public key ax·g to a second apparatus other than the first apparatus.

Also, the sixth aspect of the present invention is the method according to any one of the first to fifth aspects, further comprising the step of transmitting the second public key ax·g from a first apparatus that calculated the second public key ax·g to a second apparatus other than the first apparatus.

Also, the seventh aspect of the present invention is the method according to any one of the first to fifth aspects, further comprising the step of displaying the second public key ax·g on a display screen of a first apparatus that generated the second public key ax·g.

Also, the eighth aspect of the present invention is the method according to any one of the first to seventh aspects, further comprising the step of transmitting the second secret key ax to a second apparatus other than a first apparatus that generated the second public key ax·g.

Also, the ninth aspect of the present invention is the method according to any one of the first to seventh aspects, further comprising the step of displaying the second secret key ax on a display screen of a first apparatus that generated the second public key ax·g.

Also, the tenth aspect of the present invention is the method according to any one of the first to seventh aspects, wherein the second secret key ax is stored in a storage medium other than a first apparatus that generated the second secret key ax·g.

Also, the eleventh aspect of the present invention is the method according to the first to tenth aspects, wherein the x is a pseudo-random number.

Also, the twelfth aspect of the present invention is a program for causing a computer to perform a method of generating a second key pair comprising a second secret key and a second public key in association with a first key pair comprising a first secret key and a first public key, wherein a first secret key is a, a generator of a cyclic group G is g, a first public key is a·g, a second secret key is ax, and a second public key is ax·g, the method comprising steps of: determining an integer x, determining a second secret key ax (where ax is an integer), multiplying the first public key a·g (where a is an integer) by the x, multiplying the first secret key a by the x and the g or multiplying the second secret key ax by the g, to calculate and store the second public key ax·g.

Also, the thirteenth aspect of the present invention is an apparatus for generating a second key pair comprising a second secret key and a second public key in association with a first key pair comprising a first secret key and a first public key, wherein a first secret key is a, a generator of a cyclic group G is g, a first public key is a·g, a second secret key is ax, and a second public key is ax·g, configured to: determine an integer x, determine a second secret key ax (where ax is an integer), multiply the first public key a·g (where a is an integer) by the x, multiply the first secret key a by the x and the g, or multiply the second secret key ax by the g, to calculate and store the second public key ax·g.

Also, the fourteenth aspect of the present invention is a method for proving a reliability of a second public key which is part of a second key pair generated in association with a first key pair comprising a first secret key and a first public key, wherein a first secret key is a, a generator of a cyclic group $G_1$ is $g_1$, a first public key is $a \cdot g_1$, a second secret key is ax, a second public key is $ax \cdot g_1$, and $H(n_1, n_2, \ldots n_N)$ (N is an integer greater than or equal to 1) is a hash function, comprising steps of: receiving a proof request for a proof of a reliability of the second public key $ax \cdot g_1$, calculating a verification formula expressed in equation (1) to verify proof data including $x \cdot H(n_1, n_2, \ldots n_N)$ and $ax \cdot H(n_1, n_2, \ldots n_N)$ in response to the proof request, and transmitting a result of the verification as a response to the proof request, $$e(ax \cdot g_1, H) = e(a \cdot g_1, x \cdot H) = e(g_1, ax \cdot H) \tag{1}$$

wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

Also, the fifteenth aspect of the present invention is the method according to the fourteenth aspect, wherein N is greater than or equal to 2 and $n_2$ is data representing an attribute given to the second key pair.

Also, the sixteenth aspect of the present invention is the method according to the fourteenth or fifteenth aspect, wherein the proof request includes the second public key $ax \cdot g_1$.

Also, the seventeenth aspect of the present invention is the method according to the fourteenth or fifteenth aspect, wherein the proof request includes the proof data.

Also, the eighteenth aspect of the present invention is a program for causing a computer to perform a method for proving a reliability of a second public key which is part of a second key pair generated in association with a first key pair comprising a first secret key and a first public key, wherein a first secret key is a, a generator of a cyclic group $G_1$ is $g_1$, a first public key is $a \cdot g_1$, a second secret key is ax, a second public key is $ax \cdot g_1$, and $H(n_1, n_2, \ldots n_N)$ (N is an integer greater than or equal to 1) is a hash function, comprising steps of: receiving a proof request for a proof of a reliability of the second public key $ax \cdot g_1$, calculating a verification formula represented by equation (1) to verify proof data including $x \cdot H(n_1, n_2, \ldots n_N)$ and $ax \cdot H(n_1, n_2, \ldots n_N)$ in response to the proof request, and transmitting a result of the verification as a response to the proof request, $$e(ax \cdot g_1, H) = e(a \cdot g_1, x \cdot H) = e(g_1, ax \cdot H) \tag{1}$$

wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

Also, the nineteenth aspect of the present invention is an apparatus for proving a reliability of a second public key which is part of a second key pair generated in association with a first key pair comprising a first secret key and a first public key, wherein a first secret key is a, a generator of the cyclic group $G_1$ is $g_1$, a first public key is $a \cdot g_1$, a second secret key is ax, a second public key is $ax \cdot g_1$, and $H(n_1, n_2, \ldots n_N)$ (N is an integer greater than or equal to 1) is a hash function, configured to: receive a proof request for a proof of the reliability of the second public key $ax \cdot g_1$, calculate a verification formula expressed in equation (1) to verify proof data including $x \cdot H(n_1, n_2, \ldots n_N)$ and $ax \cdot H(n_1, n_2, \ldots n_N)$ in response to the proof request, and transmit a result of the verification as a response to the proof request, $$e(ax \cdot g_1, H) = e(a \cdot g_1, x \cdot H) = e(g_1, ax \cdot H) \tag{1}$$

wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

Also, the twentieth aspect of the present invention is a method for proving a reliability of a second identifier generated in association with a first identifier, wherein a first constant is a, a generator of a cyclic group $G_1$ is $g_1$, a first identifier is $a \cdot g_1$, a second constant is ax, a second identifier is $ax \cdot g_1$, and $H(n_1, n_2, \ldots n_N)$ (N is an integer greater than or equal to 1) is a hash function, comprising steps of: receiving a proof request for a proof of the reliability of the second identifier $ax \cdot g_1$, calculating a verification formula expressed in equation (1) to verify proof data including $x \cdot H(n_1, n_2, \ldots n_N)$ and $ax \cdot H(n_1, n_2, \ldots n_N)$ in response to the proof request, and transmitting a result of the verification as a response to the proof request, $$e(ax \cdot g_1, H) = e(a \cdot g_1, x \cdot H) = e(g_1, ax \cdot H) \tag{1}$$

wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

According to one aspect of the present invention, since a second key pair can be defined so that a second public key which is part of the second key pair generated in association with a first key pair can be mathematically proved as a child key of a first public key which is part of the first key pair, the generation of the second key pair that can be used for digital signature is made possible without the need for a certification authority.

DETAILED DESCRIPTION OF THE DRAWINGS

Hereinafter, embodiments of the present invention will be described in detail with reference to the drawings.

First Embodiment

Figure 1:
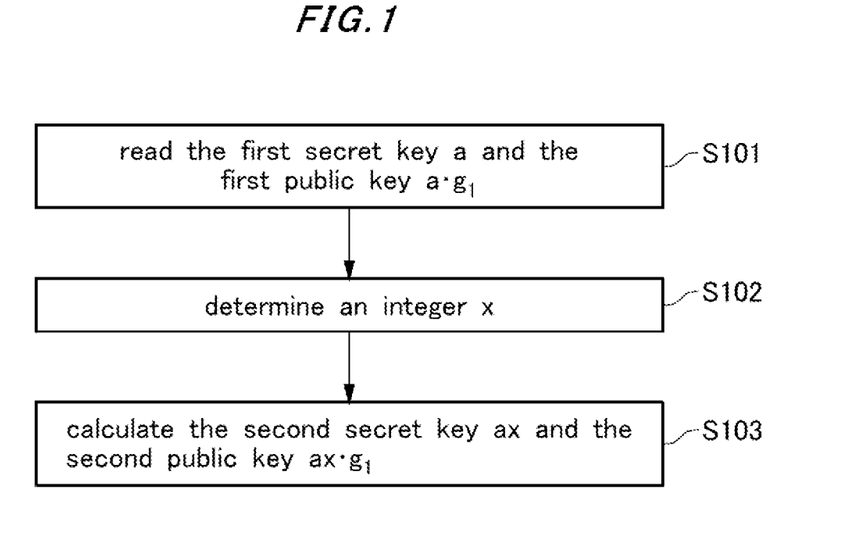
FIG. 1 shows a flowchart of a method of generating a second key pair from a first key pair according to the first embodiment of the present invention.

FIG. 1 shows a flowchart of a method for generating a second key pair from a first key pair according to the first embodiment of the present invention. The generation of a key pair can be performed on any apparatus capable of performing the processes described below, which can be a portable device such as a smartphone, tablet, etc., by way of example. It is not necessarily needed to be connected to a computer network, such as the Internet, during the generation of the second key pair.

On the apparatus, $G_1$ is defined as a cyclic group with $g_1$ as its generator, $G_2$ is defined as a cyclic group with $g_2$ as its generator, and $G_T$ is defined as a cyclic group with $g_T$ as its generator. A map e is defined as a map from $G_1 \times G_2$ to $G_T$, and a hash function H'(m) is defined as a map from any data m to $G_2$. It is possible to compute the map e and the hash function H'(m) on the apparatus. In addition, the map e shall satisfy the bilinearity shown by the following equation, with a and b as arbitrary integers.

$$e(a \cdot g_1, b \cdot g_2) = g_T^{ab}$$

The orders of the generators $g_1$ and $g_2$ should be prime, and the respective numbers of elements of the cyclic groups G1 and G2 generated by respective generators are preferably greater than or equal to 32 bytes, or 256 bits, as an example. Here, the operations in the cyclic groups G1 and G2 are described additively; for example, the operation of repeatedly adding the generator $g_1$ a times is expressed as $a \cdot g_1$ and referred to as "multiplying a to a generator $g_1$". Note that multiplication between the elements of a set of integers, such as ax, is also used herein as a notation, but it is different from multiplication in a cyclic additive group. Although the cyclic groups G1 and G2 are described herein as additive groups, we remind you that they are equivalent to the present invention and are within the technical scope of the present invention even if they are described as cyclic multiplicative groups.

First, read the pre-generated first secret key a and the first public key $a \cdot g_1$ as the first key pair (S101). Here, a is an integer, preferably determined as a random number, for example. Next, determine an integer x (S102). Here, the integer x can be determined, for example, as a random number or a pseudo-random number, preferably other than 1. As an example, we can define i as an integer and a pseudo-random number x as a hash value with a+i as the argument. In this way, the ith determined x can be calculated as appropriate without having to store the ith determined x. Then, as the second key pair, the second secret key ax and the second public key $ax \cdot g_1$ are calculated and stored by multiplying x (S103).

The owner of the public key $a \cdot g_1$ can be assumed in this embodiment to be certified by a digital certificate issued by a conventional trusted certification authority. Alternatively, it can be assumed to be provided reliability by some form other than certification by a certification authority.

If the first key pair is used to perform a digital signature on arbitrary data m, if $a \cdot H'(m)$ is the signature s, then using the disclosed generator $g_1$ and the first public key $a \cdot g_1$, the recipient of the data m and the signature s can compute the following equation, and the signature s can be verified by matching the left and right sides, which shows that the first key pair defined as described above can be used as a cryptographic scheme.

$$e(a \cdot g_1, H'(m)) = e(g_1, a \cdot H'(m)) = e(g_1, s)$$

Similarly, the second key pair can be shown to be a valid cryptographic scheme. But unless it is provable that the second public key, $ax \cdot g_1$, was generated by the owner of the first public key, $a \cdot g_1$, to which reliability has been provided, the signature by the second key pair cannot be any more reliable than that it was signed by the second secret key, ax. This point will be discussed in the second embodiment.

As a cryptographic scheme for electronic proof of arbitrary data m, a cryptographic scheme using an elliptic curve such as Elliptic Curve DSA can be employed if the elements of the cyclic group $G_1$ generated by the generator $g_1$ are points on an elliptic curve and a known predetermined relationship between the elements holds.

Here, in the explanation above, it is assumed that the first secret key a and the first public key $a \cdot g_1$ are determined and stored in advance, but the first secret key a may be determined in advance and the first public key $a \cdot g_1$ can be calculated if necessary. In the description above, an integer x is determined after the first secret key a and the first public key $a \cdot g_1$ are determined, but the first secret key a and, if necessary, the first public key $a \cdot g_1$ may be determined after the integer x is determined. Also, instead of determining the first secret key a directly, the integer x and the second secret key ax may be determined and stored as random or pseudo-random numbers, respectively, and the first secret key a may be calculated from these values. In other words, the generation of the second key pair includes various aspects of generation in association with the first key pair. The value of x may also be calculated from the value of a and the value of ax, if necessary.

The first secret key a is data never disclosed externally in principle, although it may be stored in an external storage medium or storage device for backup. Also, x is not data to be disclosed externally in principle.

One feature of the generation of the second key pair according to this embodiment is that the second secret key ax is an element of the set of integers as well as the first secret key a, and the second public key $ax \cdot g$ is an element of the cyclic group G1 generated by the generator g as well as the first public key $a \cdot g$, so that the second key pair is of the same format as the first key pair, allowing repeatedly generating a child key pair, such as the third key pair from the second key pair and the fourth key pair from the third key pair.

It is to be noted that if the term "only" is not written, such as in "based only on x", "in response to x only", or "in the case of x only", in the present specification, it is assumed that additional information may also be taken into account. Also, as an example, it is to be noted that a description "b is performed in the case of a" does not necessarily mean "b is always performed in the case of a" except where expressly stated.

In addition, as a caveat, even if there are aspects of a method, program, terminal, apparatus, server or system (hereinafter referred to as "method, etc.") that perform operations different from those described herein, each aspect of the invention is intended to perform the same operation as one of the operations described herein, and the existence of an operation different from those described herein does not mean that the method, etc. is outside the scope of each aspect of the invention.

Second Embodiment

Figure 2:
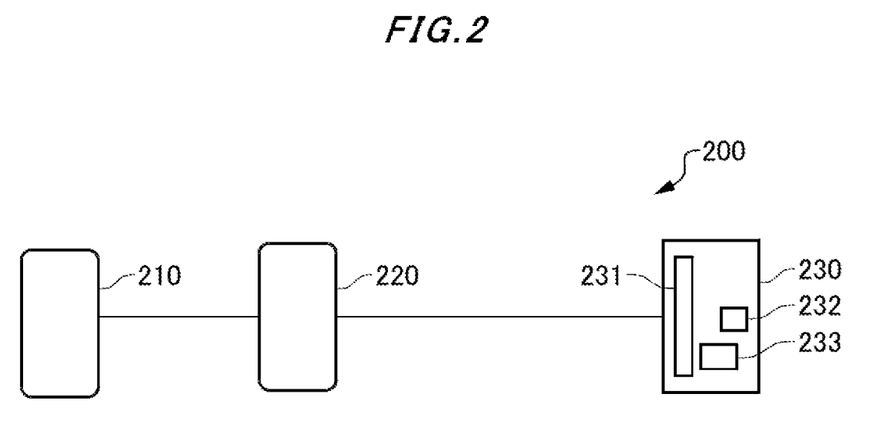
FIG. 2 shows a system for proving the reliability of a second public key which is part of a second key pair generated from a first key pair according to the second embodiment of the present invention.

FIG. 2 shows a system for proving the reliability of a second public key which is part of a second key pair generated from a first key pair, according to the second embodiment of the present invention.

The system 200 comprises a transmitting apparatus 210 that generates a second key pair from the first key pair to transmit a second public key that is part of the second key pair, a receiving apparatus 220 that receives the second public key, and a certifying apparatus 230 that proves the reliability of the second public key. The transmitting apparatus 210, the receiving apparatus 220 and the proving apparatus 230 can communicate with each other via a computer network.

The proving apparatus 230 is a computer comprising a communication unit 231, such as a communication interface, a processing unit 232, such as a processor, CPU, etc., and a storage unit 233 including a storage device or medium, such as a memory, hard disk, etc., and can realize each of the processes described below by executing a prescribed program. The proving apparatus 230 may include one or more apparatuses or servers. The program may include one or more programs, and may be stored on a computer-readable storage medium to form a non-transitory program product. With respect to the transmitting and receiving apparatuses 210 and 220, although not shown in the figure, they may have similar hardware configurations.

In the transmitting apparatus 210, the second public key $ax \cdot g_1$, which is part of the second key pair generated by the method described in the first embodiment, cannot play a role in identifying its owner if its reliability cannot be verified at the receiving apparatus 220 that receives it. Therefore, in this embodiment, the receiving apparatus 220 makes a request for a proof of the reliability of the second public key $ax \cdot g_1$ to the proving apparatus 230.

Specifically, the proving apparatus 230 receives $x \cdot H(n)$ and $ax \cdot H(n)$ as proof data in addition to the second public key $ax \cdot g_1$, either indirectly via the receiving apparatus 220 or directly from the transmitting apparatus 210. The proving apparatus 230 can prove that the second public key $ax \cdot g_1$ was generated by the owner of the first public key $a \cdot g_1$, based on the fact that the calculation result of the following verification formula shows that the three sides match, using the generator $g_1$ and the first public key $a \cdot g_1$ known and accessible in some way. Here, n is $ax \cdot g_1$ and $H(n)$ is a map to $G_2$, which can be the same or different from $H'(m)$ used for the digital signature described above.

$$e(ax \cdot g_1, H(n)) = e(a \cdot g_1, x \cdot H(n)) = e(g_1, ax \cdot H(n))$$

Since $x \cdot H(n)$ cannot be calculated without knowing the integer x, and in addition, $ax \cdot H(n)$ cannot be calculated without knowing the integer a, the fact that three sides match proves that the provider of $x \cdot H(n)$ and $ax \cdot H(n)$ is the owner of the first public key $a \cdot g_1$ who generated the second public key $ax \cdot g_1$, without knowing a and x or a and ax.

In the description above, we have considered the case where there is a single parent key pair that generates a child key pair, but when there can be multiple parent key pairs, it is necessary to specify with respect to which parent public key of a parent key pair the proof of being a child public key is needed.

The proving apparatus 230 may be the same as the receiving apparatus 220, in which case it can prove the reliability of the second public key $ax \cdot g_1$ by itself. The proving apparatus 230 may also be the same as the transmitting apparatus 210, in which case the generator of the second public key $ax \cdot g_1$ will prove its reliability by itself.

Figure 3:
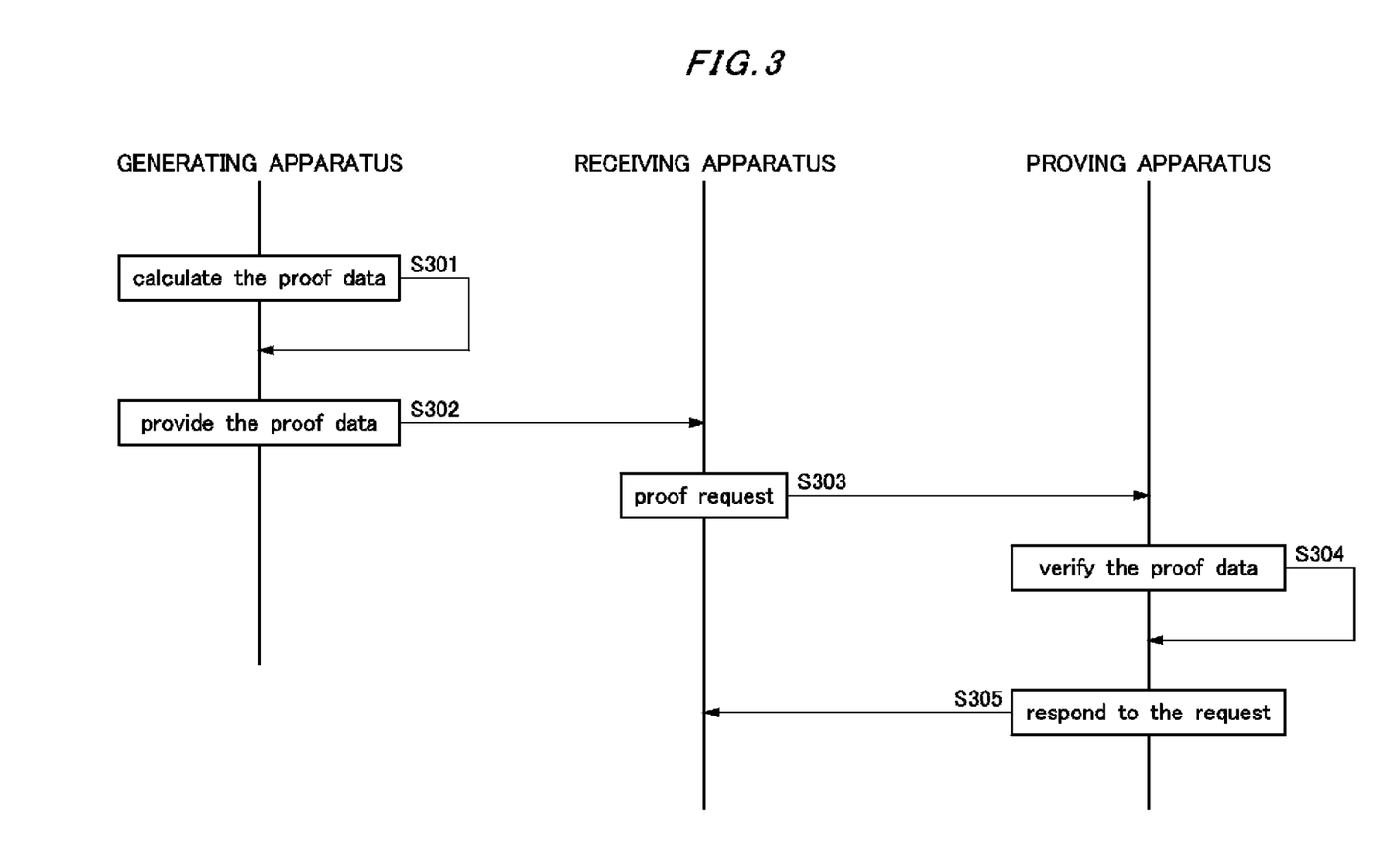
FIG. 3 shows an example of a method flow for proving the reliability of a second public key which is part of a second key pair generated from a first key pair according to the second embodiment of the present invention.

FIG. 3 shows the flow of a method of proving the reliability of a second public key, in the example of a proving apparatus receiving proof data from a generating apparatus. In the description above, we used the term transmitting apparatus, but we will use the more generalized term generating apparatus in FIG. 3.

The generating apparatus 210 calculates and stores the proof data, $x \cdot H(n)$ and $ax \cdot H(n)$, at or around the time it generates the second public key $ax \cdot g_1$ which is part of the second key pair (S301). The generating apparatus 210 provides the calculated proof data to the receiving apparatus 220 (S302). As the manners of providing data to the receiving apparatus 220, various aspects can be raised including transmission to the receiving apparatus 220 via a computer network, connection of a storage medium storing the proof data to the receiving apparatus 220, input of the proof data displayed on the display screen of the generating apparatus 210 to the receiving apparatus 220, and read out, by an image sensor of the receiving apparatus 220, of proof data displayed on a display screen on the generating apparatus 210 or corresponding data. Various aspects of providing a first public key $a \cdot g_1$ and a second public key $ax \cdot g_1$ from the generating apparatus 210 to the receiving apparatus 220 or other apparatus can be raised similarly.

While the proof data can include $H(n)$, $H(n)$ may be calculated as necessary at the proving apparatus 230 or at the generating apparatus 210 or the receiving apparatus 220 that provides the proof data to the proving apparatus 230.

Upon receiving the proof data, the receiving apparatus 220 transmits a proof request to the proving apparatus 230 asking for a proof that the second public key $ax \cdot g_1$ was generated by the owner of the first public key $a \cdot g_1$, in other words, that the second public key $ax \cdot g_1$ is in a parent-child relationship with the first public key $a \cdot g_1$ (S303).

The proof request includes proof data in this example, but need not be included in the example where the proof data is provided directly from the generating apparatus 210 to the proving apparatus 230. As noted above, in the case where the generating apparatus 210 also serves as the proving apparatus 230, "provide" includes providing it to itself. In addition, a "proof request" includes a request to itself in the case where the receiving apparatus 220 also serves as the proving device 230.

The proof request can include a second public key $ax \cdot g_1$, which is a child key in the parent-child relationship that is to be proved, and a first public key $a \cdot g_1$, which is a parent key in said parent-child relationship. At least one of the parent and child keys can be provided directly or indirectly by the generating apparatus 210 to the proving apparatus 230 and stored in advance in the proving apparatus 230, eliminating the need for explicit specification in the proof request.

The proving apparatus 230 validates the proof data by calculating a verification formula for the proof data in response to a proof request (S304).

The proving apparatus 230 then transmits the verification result as a response to the proof request from the receiving apparatus 220 (S305). When the receiving apparatus 220 also serves as the proving apparatus 230, it stores the verification result in its own storage apparatus or storage medium, but such a process may be included in the concept of "transmission" to itself.

In the above description, the first public key $a \cdot g_1$ and the second public key $ax \cdot g_1$ have been described as "public keys", but they can also be described as "identifiers" of entities that perform some activity on the Internet. Specifically, the spirit of the present invention can be understood as an apparatus, method, and program for evaluating a reliability of a second identifier generated based on or in association with a first identifier.

Third Embodiment

The transmitting apparatus 210 can also provide the receiving apparatus 220 a second secret key ax in addition to the second public key $ax \cdot g_1$, while keeping the first secret key a secret. The second secret key ax can be provided in various ways similar to other data. In this case, the receiving apparatus 220 can use the second key pair to perform an electronic signature on the data m. Then, if it receives the proof data including $x \cdot H(n)$ and $ax \cdot H(n)$ from the transmitting apparatus 210, it can, if necessary, pass $ax \cdot g_1$, $x \cdot H(n)$, and $ax \cdot H(n)$ to the recipient of the digital signature along with the data m and the signature s thereto. The recipient will be able to show that the digital signature is by the second key pair generated by the owner of the first public key $a \cdot g_1$.

The receiving apparatus 220 is functioning here as a signing apparatus and transmits to the other apparatus, as part of the signed data in which signature s is added to data m, or as separate data from the signed data, the proof data, and if necessary at least one of the first public key $a \cdot g_1$ and the second public key $ax \cdot g_1$.

The receiving apparatus 220 can generate a third key pair comprising a third secret key axy and a third public key $axy \cdot g_1$ as a further child key pair of the second key pair, if the second secret key ax is provided. Here, the integer y can be defined as a random or pseudo-random number and is preferably other than 1.

Fourth Embodiment

In the above embodiment, a single parameter n has been considered as the argument for the map $H(n)$ to $G_2$, but it may be $H(n_1, n_2, \ldots n_N)$ with N arguments (N is an integer greater than or equal to 1).

For example, when N=2, $n_1$ can be the second public key $ax \cdot g_1$ and $n_2$ can be any string str. As examples of the string str, the expiration date of the second key pair, the ID, such as an email address, of the recipient of the second public key, etc. can be raised. More generally, $n_2$ can be any data representing an attribute given to the second key pair.

The generating apparatus 210 may also receive a request for a generation of the second key pair from the receiving apparatus 220 or other apparatus prior to the generation of the second key pair and then begin the generation, and it may take some data included in the generation request as the value of the argument $n_2$.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

REFERENCE SIGNS LIST

200 System
210 Transmitting apparatus
220 Receiving apparatus
230 Proving apparatus
231 Communication unit
232 Processing unit
233 Storage unit

The invention claimed is:

1. A method for proving a reliability of a second public key which is part of a second key pair generated in association with a first key pair comprising a first secret key and a first public key, wherein the first secret key is a, a generator of a cyclic group $G_1$ is $g_1$, the first public key is $a \cdot g_1$, the second secret key is ax where x is an integer, the second public key is $ax \cdot g_1$, and $H(n_1, n_2, \ldots n_N)$ (N is an integer greater than or equal to 1) is a hash function, comprising steps of:

a first computer receiving a proof request for a proof of a reliability of the second public key $ax \cdot g_1$, from a second computer which can communicate with the first computer via a computer network, the first computer calculating a verification formula expressed in equation (1)

$$e(ax \cdot g_1, H) = e(a \cdot g_1, x \cdot H) = e(g_1, ax \cdot H) \qquad (1)$$

to verify proof data including $x \cdot H(n_1, n_2, \ldots n_N)$ and $ax \cdot H(n_1, n_2, \ldots n_N)$ in response to the proof request, and the first computer transmitting a result of the verification as a response to the proof request, wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

2. The method according to claim 1, wherein N is greater than or equal to 2 and $n_2$ is data representing an attribute given to the second key pair.

3. The method according to claim 1, wherein the proof request includes the second public key $ax \cdot g_1$.

4. The method according to claim 1, wherein the proof request includes the proof data.

5. A program for causing a first computer to perform a method for proving a reliability of a second public key which is part of a second key pair generated in association with a first key pair comprising a first secret key and a first public key, wherein the first secret key is a, a generator of a cyclic group $G_1$ is $g_1$, the first public key is $a \cdot g_1$, the second secret key is ax where x is an integer, the second public key is $ax \cdot g_1$, and $H(n_1, n_2, \ldots n_N)$ (N is an integer greater than or equal to 1) is a hash function, the method comprising steps of:

receiving a proof request for a proof of a reliability of the second public key $ax \cdot g_1$ from a second computer which can communicate with the first computer via a computer network, calculating a verification formula expressed in equation (1)

$$e(ax \cdot g_1, H) = e(a \cdot g_1, x \cdot H) = e(g_1, ax \cdot H) \qquad (1)$$

to verify proof data including $x \cdot H(n_1, n_2, \ldots n_N)$ and $ax \cdot H(n_1, n_2, \ldots n_N)$ in response to the proof request, and transmitting a result of the verification as a response to the proof request to the second computer, wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

6. A first computer for proving a reliability of a second public key which is part of a second key pair generated in association with a first key pair comprising a first secret key and a first public key, wherein the first secret key is a, a generator of a cyclic group $G_1$ is $g_1$, the first public key is $a \cdot g_1$, the second secret key is ax where x is an integer, the second public key is $ax \cdot g_1$, and $H(n_1, n_2, \ldots n_N)$ (N is an integer greater than or equal to 1) is a hash function, configured to:

receive a proof request for a proof of a reliability of the second public key $ax \cdot g_1$ from a second computer which can communicate with the first computer via a computer network, calculate a verification formula expressed in equation (1)

$$e(ax \cdot g_1, H) = e(a \cdot g_1, x \cdot H) = e(g_1, ax \cdot H) \quad (1)$$

to verify proof data including $x \cdot H(n_1, n_2, \ldots n_N)$ and $ax \cdot H(n_1, n_2, \ldots n_N)$ in response to the proof request, and send a result of the verification as a response to the proof request to the second computer, wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

7. A method for proving a reliability of a second identifier generated in association with a first identifier, wherein a first constant is a, a generator of a cyclic group $G_1$ is $g_1$, a first identifier is $a \cdot g_1$, a second constant is ax where x is an integer, a second identifier is $ax \cdot g_1$, and $H(n_1, n_2, \ldots n_N)$ (N is an integer greater than or equal to 1) is a hash function, comprising steps of:

a first computer receiving a proof request for a proof of a reliability of the second identifier $ax \cdot g_1$ from a second computer which can communicate with the first computer via a computer network, the first computer calculating a verification formula expressed in formula (1)

$$e(ax \cdot g_1, H) = e(a \cdot g_1, x \cdot H) = e(g_1, ax \cdot H) \quad (1)$$

to verify proof data including $x \cdot H(n_1, n_2, \ldots n_N)$ and $ax \cdot H(n_1, n_2, \ldots n_N)$ in response to said proof request, and the first computer transmitting a result of the verification as a response to the proof request to the second computer, wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

8. A first computer comprising a non-transitory computer readable medium and a processor for proving a reliability of a second identifier generated in association with a first identifier, wherein a first constant is a, a generator of a cyclic group $G_1$ is $g_1$, a first identifier is $a \cdot g_1$, a second constant is ax where x is an integer, a second identifier is $ax \cdot g_1$, and $H(n_1, n_2, \ldots n_N)$ (N is an integer greater than or equal to 1) is a hash function, the first computer configured to:

receive a proof request for a proof of a reliability of the second identifier $ax \cdot g_1$ from a second computer which can communicate with the first computer via a computer network, calculate a verification formula expressed in formula (1)

$$e(ax \cdot g_1, H) = e(a \cdot g_1, x \cdot H) = e(g_1, ax \cdot H) \quad (1)$$

to verify proof data including $x \cdot H(n_1, n_2, \ldots n_N)$ and $ax \cdot H(n_1, n_2, \ldots n_N)$ in response to said proof request, and transmit a result of the verification as a response to the proof request to the second computer, wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

9. A program, stored in a non-transitory computer readable medium of a first computer comprising the medium and a processor, including instructions that, when executed, causes the first computer to perform a method for proving a reliability of a second identifier generated in association with a first identifier, wherein a first constant is a, a generator of a cyclic group $G_1$ is $g_1$, a first identifier is $a \cdot g_1$, a second constant is ax where x is an integer, a second identifier is $ax \cdot g_1$, and $H(n_1, n_2, \ldots n_N)$ (N is an integer greater than or equal to 1) is a hash function, the method comprising steps of:

receiving a proof request for a proof of a reliability of the second identifier $ax \cdot g_i$ from a second computer which can communicate with the first computer via a computer network, calculating a verification formula expressed in formula (1)

$$e(ax \cdot g_1, H) = e(a \cdot g_1, x \cdot H) = e(g_1, ax \cdot H) \quad (1)$$

to verify proof data including $x \cdot H(n_1, n_2, \ldots n_N)$ and $ax \cdot H(n_1, n_2, \ldots n_N)$ in response to said proof request, and transmitting a result of the verification as a response to the proof request to the second computer, wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_i$ is $ax \cdot g_1$.

10. A non-transitory computer readable medium storing a program including instructions that, when executed, causes a first computer comprising the medium and a processor to perform a method for proving a reliability of a second identifier generated in association with a first identifier, wherein a first constant is a, a generator of a cyclic group $G_1$ is $g_1$, a first identifier is $a \cdot g_1$, a second constant is ax where x is an integer, a second identifier is $ax \cdot g_1$, and $H(n_1, n_2, \ldots n_N)$ (N is an integer greater than or equal to 1) is a hash function, the method comprising steps of:

receiving a proof request for a proof of a reliability of the second identifier $ax \cdot g_1$ from a second computer which can communicate with the first computer via a computer network, calculating a verification formula expressed in formula (1)

$$e(ax \cdot g_1, H) = e(a \cdot g_1, x \cdot H) = e(g_1, ax \cdot H) \quad (1)$$

to verify proof data including $x \cdot H(n_1, n_2, \ldots n_N)$ and $ax \cdot H(n_1, n_2, \ldots n_N)$ in response to said proof request, and transmitting a result of the verification as a response to the proof request to the second computer, wherein $G_2$ is a cyclic group with $g_2$ as a generator, $G_T$ is a cyclic group with $g_T$ as a generator, and a bilinear map e can be defined from $G_1 \times G_2$ to $G_T$, and wherein a hash function $H(n_1, n_2, \ldots n_N)$ can be defined as a map from an arbitrary combination of first to Nth data to the cyclic group $G_2$ in which $n_1$ is $ax \cdot g_1$.

* * * * *